(12) United States Patent
Nakae et al.

(10) Patent No.: US 7,345,696 B2
(45) Date of Patent: Mar. 18, 2008

(54) COLLAPSIBLE CELLULAR COMMUNICATION TERMINAL HAVING A CAMERA HAVING PHOTOGRAPHING CONTROL FUNCTION AND PHOTOGRAPHING CONTROL METHOD IN THE TERMINAL

(75) Inventors: Kazuaki Nakae, Higashiosaka (JP); Toru Matsuo, Daito (JP); Nao Hirota, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 773 days.

(21) Appl. No.: 10/474,015

(22) PCT Filed: Apr. 1, 2002

(86) PCT No.: PCT/JP02/03245

§ 371 (c)(1),
(2), (4) Date: Apr. 5, 2004

(87) PCT Pub. No.: WO02/082786

PCT Pub. Date: Oct. 17, 2002

(65) Prior Publication Data

US 2004/0166829 A1    Aug. 26, 2004

(30) Foreign Application Priority Data

Apr. 3, 2001   (JP) .............................. 2001-105199

(51) Int. Cl.
*H04N 7/16* (2006.01)

(52) U.S. Cl. .............................. 348/14.02; 348/14.01; 348/376; 455/575.3

(58) Field of Classification Search .. 348/14.01–14.09, 348/333.06, 376, 370, 373, 375; 455/575.3, 455/550.1, 575.1, 56.6, 566.1, 433; 329/433.13
See application file for complete search history.

(56) References Cited

U.S. PATENT DOCUMENTS 6,687,515 B1 *   2/2004   Kosaka .................... 455/566
2001/0036845 A1 * 11/2001   Park ....................... 455/566

FOREIGN PATENT DOCUMENTS

| JP | 10-155100 | * | 6/1998 |
| JP | 10234080 | | 9/1998 |
| JP | 10336498 | | 12/1998 |
| JP | 11308669 A | * | 11/1999 |
| JP | 2000-217023 | | 8/2000 |
| JP | 2001054155 A | * | 2/2001 |
| JP | 2001-69395 | | 3/2001 |
| JP | 2001-197457 | | 7/2001 |
| WO | WO 99/59312 | | 11/1999 |

* cited by examiner

*Primary Examiner*—Melur Ramakrishnaiah

(57) ABSTRACT

A folding mobile communications terminal according to the present invention is a folding mobile communications terminal that has a photographing function and is openable/closable. This folding mobile communications terminal detects whether the folds are closed, and disables the photographing function if the folds are closed.

12 Claims, 4 Drawing Sheets

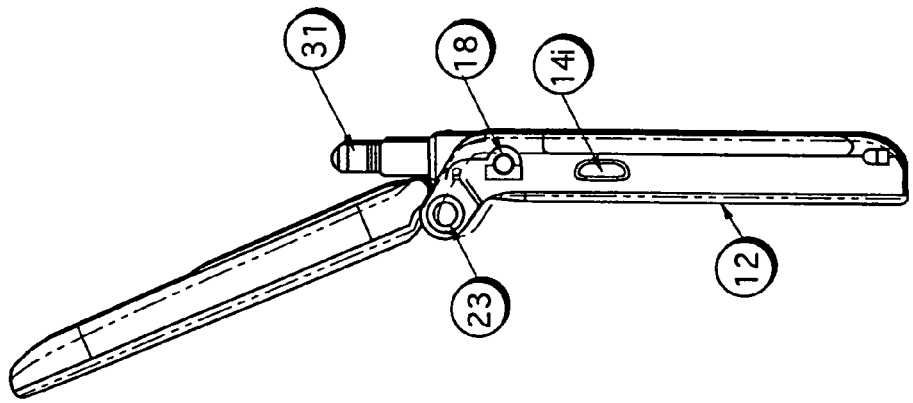
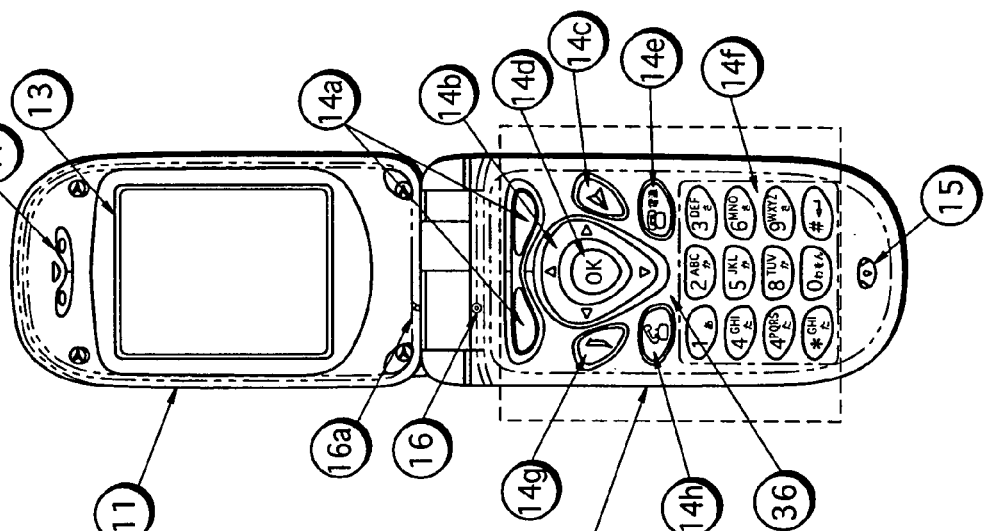
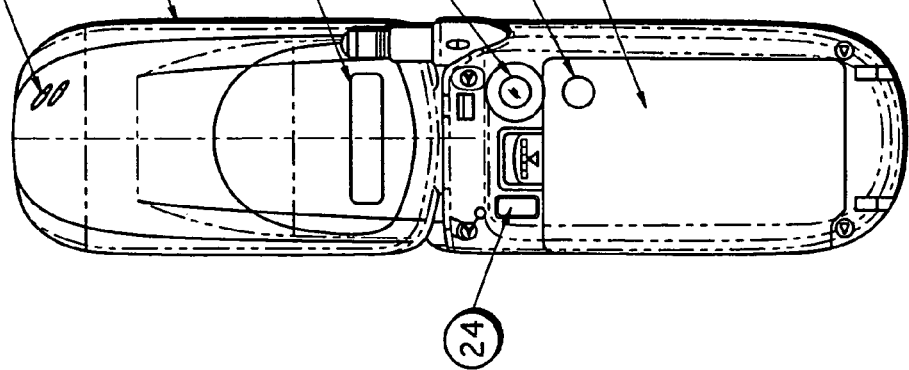

COLLAPSIBLE CELLULAR COMMUNICATION TERMINAL HAVING A CAMERA HAVING PHOTOGRAPHING CONTROL FUNCTION AND PHOTOGRAPHING CONTROL METHOD IN THE TERMINAL

TECHNICAL FIELD

The present invention relates to a folding built-in camera mobile communications terminal that has a photographing control function, and a photographing control method used in the terminal.

BACKGROUND ART

In recent years, multiple functions have rapidly been developed for mobile communications terminals such as mobile telephones. Lately, built-in camera mobile telephones, which have a CCD (Charge Coupled Device) camera that employs semiconductor photodetectors for converting light into electrical signals, are coming into wide use.

Built-in camera mobile telephones are convenient in terms of that a user can take them along anywhere and photograph desired objects anytime with ease. Here, "to photograph" represents a process of forming an image of an object on the surface of a semiconductor photodetector through a lens of a camera and converting the formed image into image data.

A CCD camera is arranged on the rear side of such built-in camera mobile telephone. The object image photographed by the CCD camera is displayed on a liquid crystal screen provided on the front side of the mobile telephone. This enables the user to see the image of the photographed object on the liquid crystal screen on the spot. Furthermore, the user can store the photographed object image in the mobile telephone, or send it to his/her friends and family by email.

Recently, however, such convenient built-in camera mobile telephones are often misused to take sneak shots, which poses a social problem. Also, built-in camera mobile telephones are made foldable so that they become compact. While this makes the built-in camera mobile telephones even more convenient, this causes apprehension about increase in the attempts of taking sneak shots using such increasingly convenient folding built-in camera mobile telephones.

DISCLOSURE OF THE INVENTION

It is an object of the present invention to provide a folding built-in camera mobile communications terminal with a photographing control function to prevent attempts of taking sneak shots and a photographing control method used in the terminal.

The above object is achieved by a folding mobile telephone that has a photographing function and is openable and closable. The folding mobile telephone includes (i) a photographic lens which is exposed externally irrespective of whether the folding mobile telephone is in a closed state, a partly-open state, or a completely-open state, (ii) a detecting unit operable to detect whether the folding mobile telephone is in the closed state, and (iii) a photographing control unit operable to disable the photographing function when the detecting unit detects that the folding mobile telephone is in the closed state.

The above-mentioned constituent features make a photographer unable to perform photographing when the folding mobile telephone is in the closed state and thereby in its compact state. It is therefore difficult for the photographer to take photos without being noticed by the people around him/her. As a result, the attempts of taking sneak shots are effectively prevented.

The detecting unit may further detect whether the folding mobile telephone is in the partly-open state. The photographing control unit may further disable the photographing function when the detecting unit detects that the folding mobile telephone is in the partly-open state.

In addition, the above-mentioned object may be achieved by a photographing control method for a folding mobile telephone that has a photographing function and is openable and closable. The photographing control method includes (i) a detecting step of detecting that the folding mobile telephone is in one of a closed state and a partly-open state, the partly-open state being a state in which the folding mobile telephone is not completely open, and (ii) a photographing control step of disabling the photographing function when detected that the folding mobile telephone is in one of the closed state and the partly-open state.

These features can prevent the photographer from taking sneak shots using the folding mobile telephone in a partly-open state.

The photographing control unit may include a warning unit operable to generate a warning when the detecting unit detects that the folding mobile telephone is in one of the closed state and the partly-open state.

The photographing control unit may include a warning unit operable to generate a warning when the detected opening angle is below the threshold angle.

The photographing control unit may include a warning unit operable to generate a warning when the detecting unit detects that the folding mobile telephone is in the closed state.

The above-mentioned constituent features enable the photographer to notice that the photographing function has been disabled.

The folding mobile telephone further includes a lightness judging unit operable to (i) measure lightness which indicates a level of ambient light and (ii) judge whether the lightness is below a threshold level. The photographing control unit may further disable the photographing function when the lightness judging unit judges that the lightness is below the threshold level.

These constituent features prohibit photographing performed in dark places, where sneak shots are likely to be taken. As a result, the above features can effectively prevent vile attempts, for example, taking downblouse and upskirt shots.

The photographing control unit may include a warning unit operable to generate a warning when the lightness judging unit judges that the lightness is below the threshold level.

This constituent feature can arouse attention of targets of sneak shots so that they easily notice the vile attempts.

The folding mobile telephone may further include a lightness judging unit operable to (i) measure lightness which indicates a level of ambient light and (ii) judge whether the lightness is below a threshold level. The photographing control unit may include a warning unit operable to generate a warning when the lightness judging unit judges that the lightness is below the threshold level.

The warning unit may generate the warning by emitting light.

The warning unit may generate the warning by making the folding mobile communications terminal vibrate.

The warning unit may generate the warning by outputting a voice message.

The above-mentioned constituent features enable a warning to be generated when the photographer attempts to capture sneak shots in dark places. Accordingly, the targets of the sneak shots immediately notice that they are secretly photographed.

BRIEF DESCRIPTION OF THE DRAWINGS

FIG. 1 shows an external view of a folding mobile communications terminal 1 in the open state, wherein, more specifically, FIG. 1A shows a front view of the folding mobile communications terminal 1, FIG. 1B shows a right side view of the folding mobile communications terminal 1, and FIG. 1C shows a rear view of the folding mobile communications terminal 1.

BEST MODE FOR CARRYING OUT THE INVENTION

Figure 2:
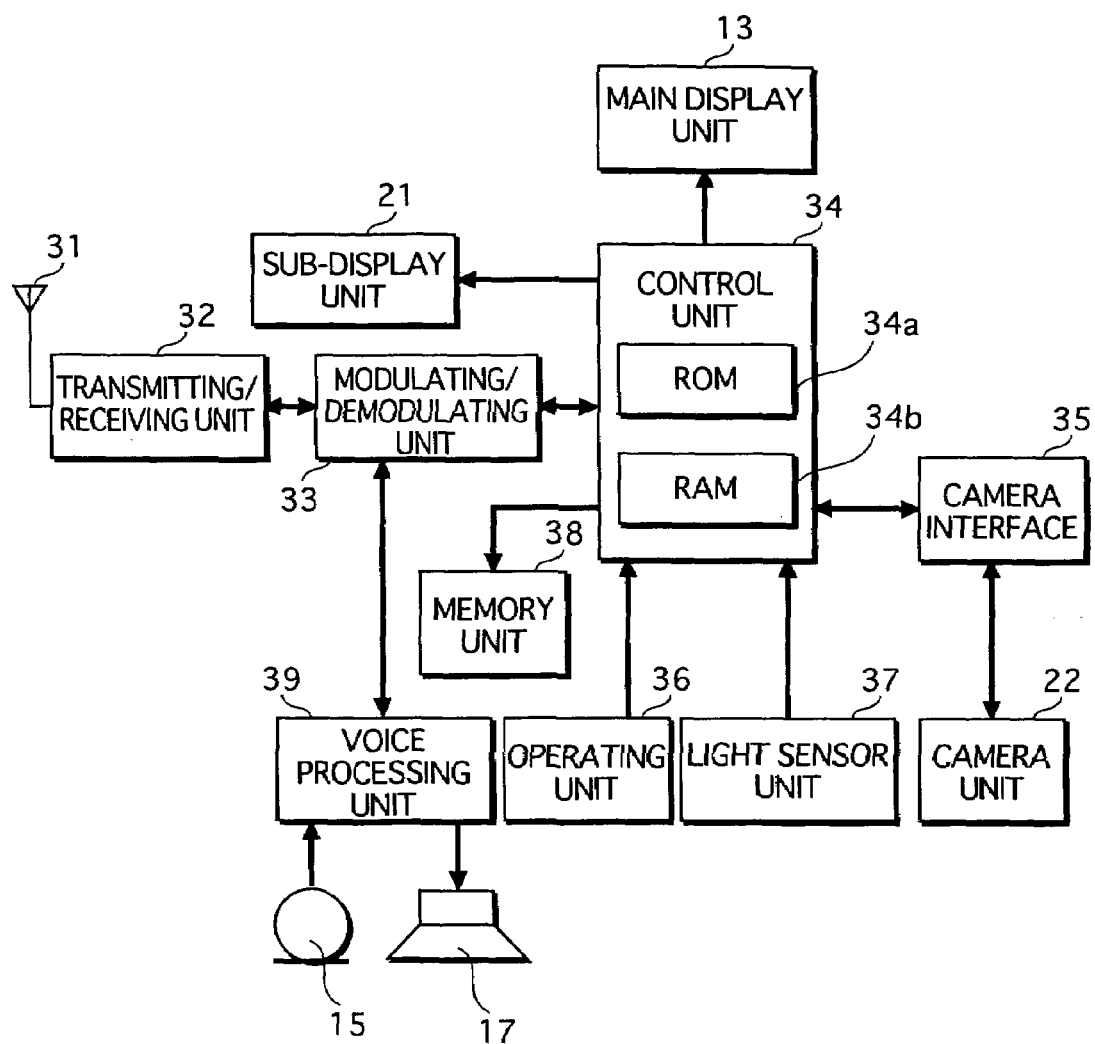
FIG. 2 is a functional block diagram showing a configuration of the folding mobile communications terminal 1.

A folding mobile communications terminal to which an embodiment of the present invention relates is a folding mobile communications terminal that has a photographing function and is openable and closable. This folding mobile communications terminal detects whether the folds are closed, and disables the photographing function if the folds are closed.

Construction

The following describes, in detail, the folding mobile communications terminal according to the present invention, with reference to the attached figures.

FIG. 1 shows an external view of a folding mobile communications terminal 1 relating to the present embodiment in the open state, wherein, more specifically, FIG. 1A shows a front view of the folding mobile communications terminal 1, FIG. 1B shows a right side view of the folding mobile communications terminal 1, and FIG. 1C presents a rear view of the folding mobile communications terminal 1.

The folding mobile communications terminal 1 includes: a subhousing 11; a subhousing 12; a main display unit 13; an operating unit 36; a microphone 15; an open/close state detecting unit 16; a receiver 17; an earphone terminal 18; an antenna 31; a speaker 20; a sub-display unit 21; a camera unit 22; a hinge unit 23; a mirror 24; and an opening 25.

To make the description simple, the subhousing 11, the subhousing 12, the open/close state detecting unit 16, a side key 14i included in the operating unit 36, the earphone terminal 18, the mirror 24, and the opening 25 are described first, and the other constituents will be described in the later part.

The subhousing 11 and the subhousing 12 are joined together by means of the hinge unit 23 provided therebetween, to form a foldable housing. The main display unit 13 and the receiver 17 are arranged on the inner surface (shown in FIG. 1A) of the subhousing 11. The speaker 20 and the sub-display unit 21 are arranged on the outer surface (shown in FIG. 1C) of the subhousing 11.

The operating unit 36 and the microphone 15 are arranged on the inner surface (shown in FIG. 1A) of the subhousing 12. The camera unit 22, the mirror 24, and the opening 25 are arranged on the outer surface (shown in FIG. 1C) of the subhousing 12. The side key 14i that functions as a shutter button for performing photographing with the camera unit 22 is arranged on the side of the subhousing 12.

Also, a photographic lens included in the camera unit 22 is arranged on the surface of the subhousing 12.

The side key 14i is used to perform photographing with the camera unit 22. The side key 14i has two states, namely, halfway pressed and fully pressed. When the side key 14i is halfway pressed, a photographing operation start instruction is issued to a control unit 34 (described later). When fully pressed, a photographing execution instruction is issued.

Here, the "photographing operation start instruction" is an instruction to have the camera unit 22 start capturing an object image and sequentially display, on the main display unit 13, as image data, the captured object image.

The "photographing execution instruction" is an instruction to have a memory unit 38 (described later) store an object image that is photographed by the camera unit 22 at the point of the issuance of the photographing execution instruction.

The open/close state detecting unit 16 is a microswitch that mechanically detects whether the folding mobile communications terminal 1 is in the open state or the closed state. For instance, the detection is performed in the following manner. A convex part (indicated by reference numeral 16a in FIG. 1A) is provided on the subhousing 11. If the convex part is pressing down the open/close state detecting unit 16, the open/close state detecting unit 16 mechanically detects that the folding mobile communications terminal 1 is in the closed state, and outputs a detection signal to the control unit 34 (described later). In this way, the control unit 34 can detect that the folding mobile communications terminal 1 is in the closed state.

As an alternative, the open/close state detecting unit 16 may perform the detection in the following manner. A light sensor is provided in the open/close state detecting unit 16. This light sensor generates a voltage according to the quantity of light received by the light sensor through an opening provided on the open/close state detecting unit 16. The folding mobile communications terminal 1 is judged as being in the open state if the generated voltage is greater than a threshold voltage that is determined beforehand in connection with the open state, or judged as being in the partly-open state if the generated voltage is no more than the threshold voltage. Likewise, the folding mobile communications terminal 1 is judged as being in the closed state if the generated voltage is below a threshold voltage that is determined beforehand in connection with the closed state.

Here, the "partly-open state" represents a state in which the folding mobile communications terminal 1 is not completely open, for example, the opening angle between the inner surfaces of the subhousing 11 and subhousing 12 is not more than a predetermined angle, say, 90 degrees.

The detection may be performed using other known techniques, such as using an encoder to detect the opening angle between the subhousing 11 and the subhousing 12.

The earphone terminal 18 is used for connecting an earphone microphone to the folding mobile communications terminal 1.

The mirror 24 is used when a user attempts to take a photo of himself/herself. More specifically, the user can make sure that the photographic lens of the camera unit 22 properly finds himself/herself, by checking whether s/he can see his/her own reflections in the mirror 24.

The opening 25 lets ambient light in so that a light sensor unit 37 (described later) can detect a level of the ambient light of the subhousing 12 (hereinafter referred to as lightness).

FIG. 2 is a functional block diagram presenting a configuration of the folding mobile communications terminal 1. As shown, the folding mobile communications terminal 1 includes: the antenna 31; a transmitting/receiving unit 32; a modulating/demodulating unit 33; the control unit 34; the main display unit 13; the sub-display unit 21; the camera unit 22; a camera interface (I/F) 35; the operating unit 36; a voice processing unit 39; the microphone 15; the receiver 17; the light sensor unit 37; and the memory unit 38.

The antenna 31 transmits and receives radio waves for communication.

The transmitting/receiving unit 32 transmits and receives data which is communicated via radio waves. Here, the communication data includes: sound data of a telephone conversation; character information; image data; control data used to control communication (e.g. information regarding incoming voice communication such as a telephone number of a caller, information regarding incoming emails and text messages that are sent using the Short Message Service (SMS) bearer) and the like.

The modulating/demodulating unit 33 modulates communication data to be transmitted. The modulating/demodulating unit 33 also demodulates received communication data, and outputs it to the voice processing unit 39.

The control unit 34 includes, for example, a microprocessor, a Read Only Memory (ROM) 34a, and a Random Access Memory (RAM) 34b. The control unit 34 performs various kinds of control such as photographing control, according to a control program stored in the ROM 34a. More specifically, the control unit 34 performs the photographing control based on: the user's instruction concerning photographing (a photographing operation start instruction or a photographing execution instruction) inputted via the side key 14i; a detection signal outputted from the open/close state detecting unit 16; and a voltage which is outputted from the light sensor unit 37. When the control unit 34 receives the photographing execution instruction, the control unit 34 reads, from the RAM 34b, image data of a captured object image and stores the image data in the memory unit 38.

The above-mentioned photographing control performed by the control unit 34 is explained in detail later.

The ROM 34a stores the control program mentioned above and a threshold voltage which is compared with the voltage outputted from the light sensor unit 37.

The RAM 34b stores communication data received and to be transmitted; image data of a captured object image, phonebook data (for example, 999 memory dial entries) and the like, temporarily or until the user erases or changes the data via the operating unit 36.

Note that a large-capacity RAM dedicated to store image data of a captured object image may be provided in addition to the RAM 34b.

The main display unit 13 can be realized by any of a color liquid crystal display apparatus, a digital micromirror device (DMD), an organic electro luminescence (EL) display apparatus, a plasma display panel (PDP) and the like. The main display unit 13 displays: an object image captured by the camera unit 22 (a moving image or an intermittent image in almost real time captured after a photographing operation start instruction is issued but before a photographing execution instruction is issued, or a still image photographed at the point of the issuance of the photographing execution instruction); information that has to be notified to the user such as a call register; character information including emails, phonebook data and the like; current time information and the like. Here, when the open/close state detecting unit 16 outputs a detection signal indicating that the folding mobile communications terminal 1 is in the closed state and the control unit 34 detects the detection signal, the display on the main display unit 13 is turned off or a backlight (not illustrated) installed in the main display unit 13 is switched off by the control unit 34.

The sub-display unit 21 can be realized by any of color liquid crystal display apparatus, a DMD, an organic EL display apparatus, a PDP and the like. The sub-display unit 21 displays: a standby screen; information that has to be notified to the user such as a call register; current time information and the like.

The camera unit 22 is connected to the control unit 34 via a flexible cable and the camera I/F 35, and includes a built-in camera. An image of an object is formed on the surface of semiconductor photodetectors through a photographic lens of the built-in camera (the photographic lens is positioned at the camera unit 22 on the outer surface of the subhousing 12 shown in FIG. 1C). The formed image is converted into electrical signals of a certain quantity that is determined in accordance with the amount of light received by each of the photodetectors. The electrical signals are then analog-to-digital converted, and stored into the RAM 34b in the control unit 34 via the camera I/F 35 as image data. A CCD camera, a CMOS (complementary metal oxide semiconductor) camera or the like can be used for the built-in camera.

The camera I/F 35 has the camera unit 22 start a photographing operation responding to a photographing operation start instruction from the control unit 34. The camera I/F 35 has the camera unit 22 terminate the photographing operation responding to a photographing operation terminating instruction from the control unit 34.

The "photographing operation" is an operation in which image data of an object image captured by means of the camera unit 22 is sequentially outputted, from the camera unit 22, to the control unit 34 and stored in the RAM 34b.

The operating unit 36 includes various function keys to receive the user's instructions. According to the example of FIG. 1A, the operating unit 36 includes: multi-function keys 14a; a navigation key 14b; an email key 14c; an OK key 14d; an end key 14e; a keypad 14f; an Internet key 14g; a start key 14h; and the side key 14i.

It should be noted that FIG. 1A shows only one example of various function key types and arrangements included in the operating unit 36, and the present invention is not limited to such.

The multi-function keys 14a have several different functions according to the contents of display on the main display unit 13. In detail, when a menu screen is displayed, the multi-function keys 14a function as selection keys for the user to choose a desired item. When a standby screen is displayed, the multi-function keys 14a function as keys for accessing the menu screen.

The navigation key 14b is used to move a cursor up/down/left/right. Depending on the contents of display on the main display unit 13, the navigation key 14b may function as a key to set a sound volume, a key to access stored telephone numbers, or a key to perform kana-to-kanji conversion.

The email key 14c is used to display an email on the main display unit 13. The email key 14c is also used for deleting characters displayed on the main display unit 13 or for returning to an immediately preceding display.

The OK key 14*d* is used to confirm the selection made using the multi-function keys 14*a*.

The end key 14*e* is used for switching the folding mobile communications terminal 1 on/off, and ending calls.

The keypad 14*f* is used to input numbers and characters.

The Internet key 14*g* is used for accessing a screen for Internet connection.

The start key 14*h* is used to start incoming and outgoing phone calls.

The above-mentioned various function keys can be push buttons, a touch panel, or jog dials.

The voice processing unit 39 digital-to-analog converts communication data which is outputted from the modulating/demodulating unit 33, and outputs the communication data to the receiver 17 in the form of sound signals. The voice processing unit 39 also converts sounds that are outputted from the microphone 15 into sound signals, and outputs the sound signals to the modulating/demodulating unit 33 as communication data to be transmitted.

Also, the voice processing unit 39 has the speaker 20 generate a warning sound, in response to a warning sound generating instruction issued by the control unit 34.

The microphone 15 outputs sounds inputted thereto to the voice processing unit 39.

The receiver 17 reproduces sounds based on the sound signals that are outputted from the voice processing unit 39.

The light sensor unit 37 is realized by a detecting circuit including a light sensor (a photodiode, for example) that is a device for converting light signals into electrical signals, a resistor, and a transistor. The light sensor unit 37 outputs, to the control unit 34, a voltage generated in accordance with the quantity of light received by the light sensor through the opening 25. The opening 25 is arranged so as to be close to the photographic lens of the camera unit 22 as shown in FIG. 1C.

Note that the position of the opening 25 is not limited to the position shown in FIG. 1C. It can be arranged somewhere on the surface of one of the subhousing 11 and the subhousing 12.

The memory unit 38 receives image data of a captured object image from the control unit 34, and stores it.

Operation

Figure 3:
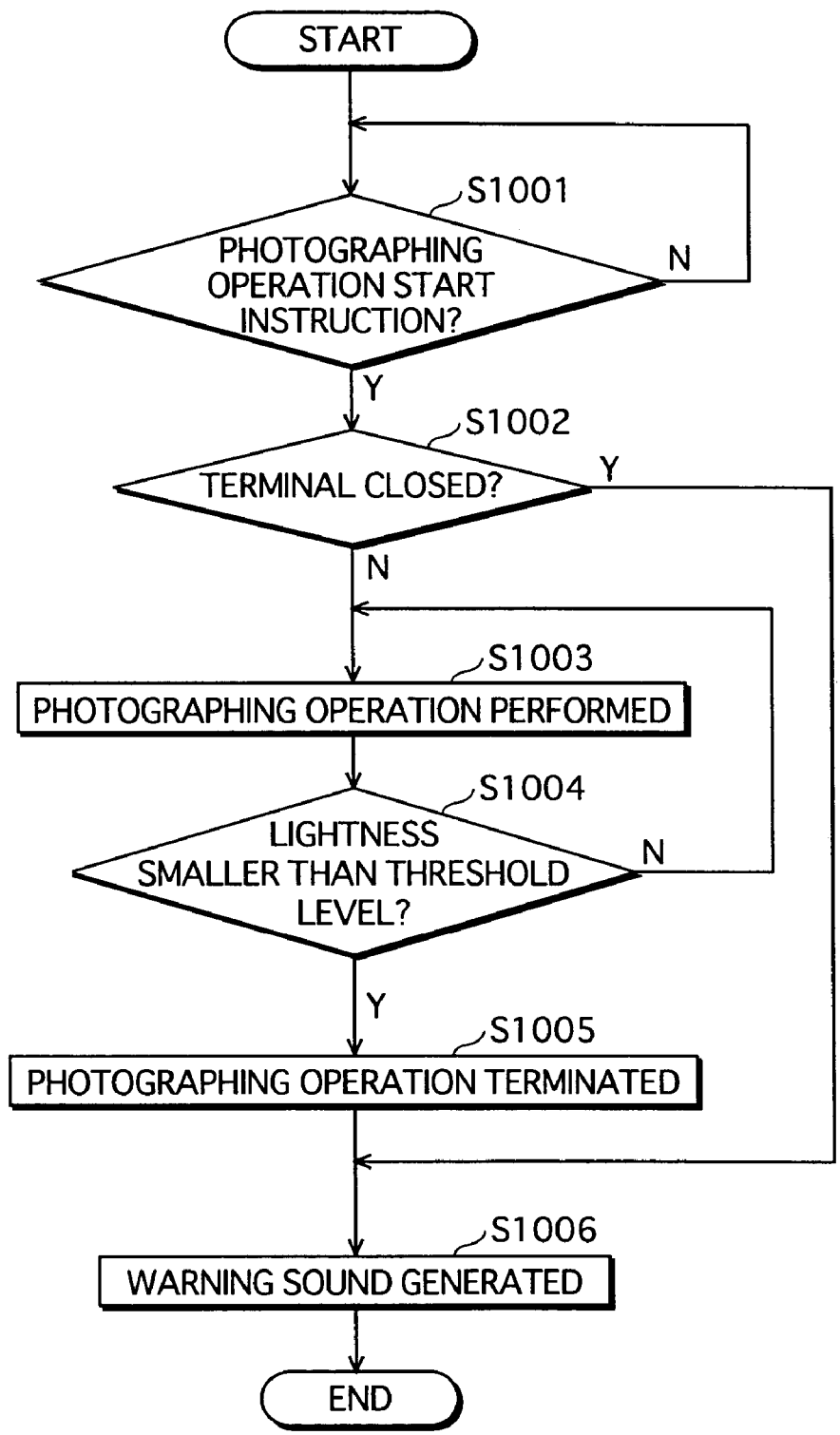
FIG. 3 is a flow chart showing, in detail, a photographing control operation performed by a control unit 34 (shown in FIG. 2).

The following part describes in detail the photographing control operation performed by the control unit 34 with reference to FIG. 3, which is a flow chart presenting the photographing control operation.

The control unit 34 judges whether a user has inputted a photographing operation start instruction or not, by detecting an operation signal that is produced when the side key 14*i* is pressed halfway down (step S1001). If the photographing operation start instruction has been inputted (step S1001:Y), the control unit 34 further judges whether the folding mobile communications terminal 1 is in the closed state or not, by checking whether a detection signal has been outputted from the open/close state detecting unit 16 (step S1002).

When the folding mobile communications terminal 1 is not in the closed state (step S1002:N), the control unit 34 performs the photographing operation through the camera I/F 35 (step S1003). Then, the control unit 34 judges whether lightness is below a threshold level or not, by examining whether a voltage outputted thereto from the light sensor unit 37 is below a threshold voltage stored in the ROM 34*a* (step S1004).

When the lightness is below the threshold level (step S1004:Y), the control unit 34 has the camera I/F 35 terminate the photographing operation (step S1005). Then, the control unit 34 has the voice processing unit 39 generate a warning sound to notify that the photographing operation has been terminated (step S1006).

When the lightness is not smaller than the threshold level (step S1004:N), the photographing operation is continued (step S1003 and step S1004).

When the folding mobile communications terminal 1 is in the closed state in step S1002 (step S1002:Y), the control unit 34 has the voice processing unit 39 generate a warning sound (step S1006).

Supplementary Explanation

The folding mobile communications terminal according to the present invention is described in the above part with reference to the embodiment. However, the present invention is not limited to the above embodiment. Example modifications are given below.

(1) According to the above embodiment, the camera unit 22 is arranged on the outer surface of the sub housing 12. However, the camera unit 22 may be arranged on the inner surface of one of the subhousing 11 and the subhousing 12. In this case, if the display screen of the sub-display unit 21 is large enough to display image data, image data outputted from the camera unit 22 can be displayed on the sub-display unit 21. This feature allows a photographer to perform photographing only when the folding mobile communications terminal 1 is in the open state. This means that, even without the open/close state detecting unit 16, it is possible to prevent attempts of taking sneak shots using the folding mobile communications terminal 1 in the closed state.

Figure 4:
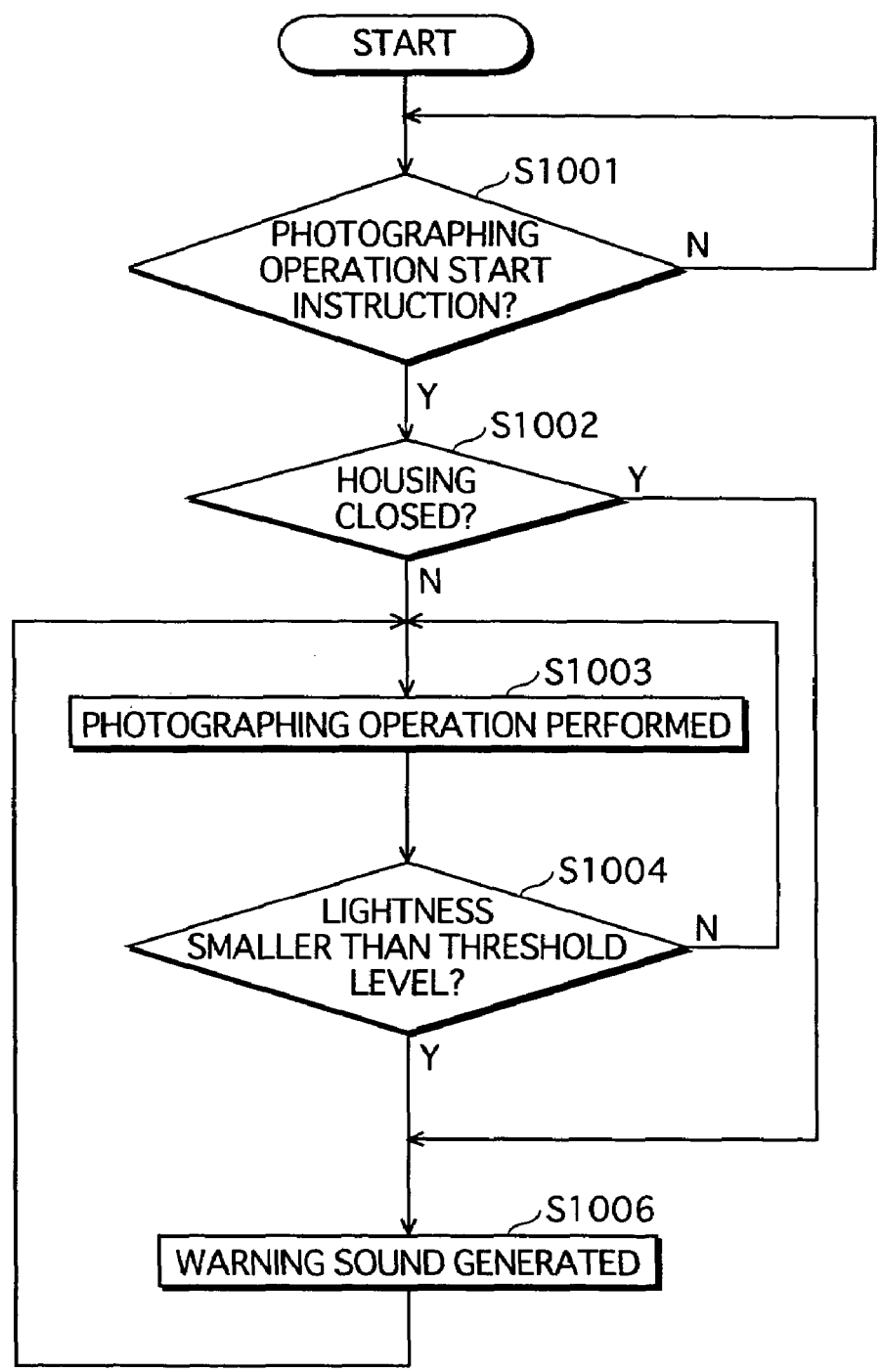
FIG. 4 is a flow chart showing, in detail, a photographing control operation performed by the control unit 34 when a warning sound is generated instead of terminating a photographing operation.

(2) In the photographing control operation according to the above embodiment, the photographing operation is terminated when the lightness is below the threshold level, as shown in the flow chart of FIG. 3 (step S1004 and step S1005). Instead of terminating the photographing operation, however, a warning sound may be generated and the photographing operation may be continued. This alternative photographing control operation is shown in the flow chart of FIG. 4. As shown in FIG. 4, when the lightness is below the threshold level (step S1004:Y), the control unit 34 has the voice processing unit 39 generate a warning sound (step S1006).

As steps of the flow chart of FIG. 4 are the same as those of the flow chart of FIG. 3, their explanation will be omitted.

(3) In the photographing control operation according to the above embodiment and the modification (2), a warning sound is generated in step S1006 as shown in FIG. 3 and FIG. 4. Note that, however, the warning sound can be replaced with any of a warning voice message, warning light, and vibration alert.

(4) In the photographing control operation according to the above embodiment, when the folding mobile communications terminal 1 is in the closed state, the photographing operation is terminated, as shown in FIG. 3. However, the photographing operation may be also terminated, when the folding mobile communications terminal 1 is in the partly-open state. Whether the folding mobile communications terminal 1 is in the partly-open state or not is, for example, detected in the following manner. A light sensor is provided in the open/close state detecting unit 16. This light sensor outputs, to the control unit 34, a voltage generated according to the quantity of light received by the light sensor. The control unit 34 compares the voltage with a threshold voltage that is determined beforehand in connection with the partly-open state, to perform the detection. In other words, the control unit 34 examines whether the voltage outputted from the light sensor is below the above threshold voltage or not, so as to judge whether the folding mobile communications terminal 1 is in one of the closed and partly-open states, or not in step S1002 of the flow chart in FIG. 3.

(5) As for the photographing control operation according to the above embodiment, if the control unit 34 judges that the folding mobile communications terminal 1 is in the closed state while the photographing operation is performed, the control unit 34 may terminate the photographing operation, generate a warning sound, or terminate the photographing operation as well as generate a warning sound.

(6) According to the above embodiment, a photographing control function for a folding mobile communications terminal is realized. However, the present invention is equally applicable to other devices such as digital cameras and video cameras, as long as they are foldable.

INDUSTRIAL APPLICABILITY

A folding mobile communications terminal and a photographing control method according to the present invention can be utilized to prevent attempts of taking sneak shots by means of a folding mobile communications terminal that has a photographing function.

The invention claimed is:

1. A folding mobile telephone that has a photographing function for recording a photographed image and is openable and closable, comprising:
   a photographic lens which is exposed externally irrespective of whether the mobile telephone is in a closed state, a partly-open state, or a completely-open state;
   a camera unit operable to capture an image;
   a detecting unit operable to detect that the mobile telephone is in one of the closed state; and
   a photographing control unit operable to disable the photographing function while power supply is maintained to the camera unit, when the detecting unit detects that the mobile telephone is in the closed state.

2. The folding mobile telephone of claim 1, wherein the photographing control unit includes
   a warning unit operable to generate a warning when the detecting unit detects that the mobile telephone is in one of the closed state and the partly-open state.

3. The mobile telephone of claim 1, further comprising
   the detecting unit detects that the folding mobile telephone is in the partly-open state by (i) measuring lightness which indicates a level of ambient light, and (ii) judging whether the lightness is below a threshold level.

4. The mobile telephone of claim 3, wherein
   the photographing control unit generates the warning by emitting light.

5. The mobile telephone of claim 3, wherein
   the photographing control unit generates the warning by making the mobile telephone vibrate.

6. The mobile telephone of claim 3, wherein
   the photographing control unit generates the warning by outputting a voice message.

7. A folding mobile telephone that has a photographing function for recording a photographed image and is openable and closable, comprising:
   a photographic lens which is exposed externally irrespective of whether the mobile telephone is in a closed state, a partly-open state, or a completely-open state;
   a detecting unit operable to detect that the folding mobile telephone is in the partly-open state that is not completely open; and
   a photographing control unit operable to, when the mobile telephone is in the partly-open state that is not completely open to generate a warning, while maintaining the operability of the photography function for recording photographic images.

8. A folding mobile telephone of claim 7 including means for providing a warning signal to a potential third party photographic subject at a distance from the folding mobile telephone.

9. A folding mobile telephone that has a photographing function for recording a photographed image and is openable and closable, comprising:
   a photographic lens which is exposed externally irrespective of whether the mobile telephone is in a closed state, a partly-open state, or a completely-open state;
   a detecting unit operable to detect that the folding mobile telephone is in the partly-open state that is not completely open;
   a photographing control unit operable to, when the folding mobile telephone is in the partly-open state to generate a warning, and also maintaining a state of the photographing control unit of realizing the photographing function, wherein;
   the detecting unit detects that the folding mobile telephone is in the partly-open state by (i) measuring light which indicates a level of ambient light, and (ii) judging whether the measured light is below a threshold level.

10. A folding mobile telephone of claim 9 including means for providing a warning signal to a potential third party photographic subject at a distance from the folding mobile telephone.

11. A photographing control method for a folding mobile telephone that has a photographing function for recording a photographed image and is openable and closable,
    the mobile telephone including a photographic lens which is exposed externally irrespective of whether the mobile telephone is in a closed state, a partly-open state, or a completely-open state,
    the photographing control method comprising:
    a detecting step of detecting that the mobile telephone is in the partly-open state that is not completely open; and
    a photographing control step of generating a warning, and maintaining the state that is capable of realizing the photographing function, when the folding mobile telephone is in the partly-open state.

12. The photographing control method of claim 11 wherein the photographing control step generates the warning at a sufficient intensity to be ascertainable by a potential third party photographic subject at a distance from the folding mobile telephone.

* * * * *